United States Patent
Lee et al.

(10) Patent No.: US 10,468,812 B1
(45) Date of Patent: Nov. 5, 2019

(54) ELECTRICAL CONNECTOR STRUCTURE AND WATERPROOF RING THEREOF

(71) Applicant: Getac Technology Corporation, Hsinchu County (TW)

(72) Inventors: Kun-Cheng Lee, Taipei (TW); Juei-Chi Chang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/158,647

(22) Filed: Oct. 12, 2018

(51) Int. Cl.
| | |
|---|---|
| H01R 13/52 | (2006.01) |
| H01R 13/405 | (2006.01) |
| G06F 1/16 | (2006.01) |
| H01R 13/24 | (2006.01) |
| H01R 107/00 | (2006.01) |

(52) U.S. Cl.
CPC ....... H01R 13/5202 (2013.01); G06F 1/1632 (2013.01); H01R 13/24 (2013.01); H01R 13/405 (2013.01); H01R 13/521 (2013.01); H01R 2107/00 (2013.01)

(58) Field of Classification Search
CPC .............. H01R 13/521; H01R 13/5202; H01R 13/5205; H01R 13/5219; H01R 13/453
USPC .......................................... 439/271, 587, 140
See application file for complete search history.

(56) References Cited

U.S. PATENT DOCUMENTS

| | | | | |
|---|---|---|---|---|
| 4,968,044 A | * | 11/1990 | Petrak ................. | F16J 15/3204 277/380 |
| 6,315,461 B1 | * | 11/2001 | Cairns ................. | G02B 6/3816 385/56 |
| 7,481,465 B2 | * | 1/2009 | Gunderson ......... | F16L 37/0987 285/319 |
| 8,721,355 B2 | * | 5/2014 | Belack ................. | F41G 11/003 439/141 |
| 9,024,183 B2 | * | 5/2015 | Sakakura ........... | H01R 13/5202 174/50.5 |
| 9,259,109 B2 | * | 2/2016 | Samenuk ............. | A47G 19/025 |
| 9,810,260 B2 | * | 11/2017 | Tanigawa ........... | A61H 15/0092 |

* cited by examiner

*Primary Examiner* — Hien D Vu
(74) *Attorney, Agent, or Firm* — Locke Lord LLP; Tim Tingkang Xia, Esq.

(57) ABSTRACT

The present invention relates to a waterproof ring used for contacting an abutting surface. The waterproof ring comprises a ring body and a flared ring piece. The flared ring piece extends from an interior side to an exterior side of the ring body. The abutting surface presses against the flared ring piece such that the flared ring piece is deformed in an everted manner and molded to fit the abutting surface.

7 Claims, 7 Drawing Sheets

ELECTRICAL CONNECTOR STRUCTURE AND WATERPROOF RING THEREOF

BACKGROUND OF THE INVENTION

Field of the Invention

The present invention relates to electrical connectors and, more particularly, to an electrical connector structure and a waterproof ring thereof.

Description of the Prior Art

Tablet computers feature advantages of being light in weight and operable through touch screens, and thus have better portability compared to laptop computers. However, in response to user requirements of keyboards necessarily used, two-in-one tablet laptop computers have become commercially available. A two-in-one tablet laptop computer primarily includes a tablet computer and an external keyboard, and a laptop computer can be formed by correspondingly assembling the tablet computer with a connector port on the external keyboard.

The assembly of the connector port on the above external keyboard is mainly categorized into that without a waterproof and dustproof design and that with an additional vertical plastic member design. Wherein, the connector port without the waterproof and dustproof design cannot satisfy product requirements of being waterproof and dustproof; whereas the connector port with an additional vertical plastic member design may likely become distorted and deformed during the utilization process, causing a breach in a sealed position and resulting in unsatisfactory waterproof and dustproof effects.

In view of the above, with respect to the above prior art, as an object of the Applicant, the Applicant has dedicated to related researches incorporating with the application of theories to resolve the foregoing issues.

SUMMARY OF THE INVENTION

The present invention provides an electrical connector structure and a waterproof ring thereof, in which a ring body has a flared ring piece extending from an interior side to an exterior side, and when an abutting surface presses against the flared ring piece, the shape of the flared ring piece is deformed in an everted manner to be better molded to fit the abutting surface, so as to create a seal at the interface and achieve enhanced waterproof or dustproof effects.

In one embodiment of the present invention, the present invention provides an electrical connector structure used for a dock connector. The dock connector includes an abutting surface and a plurality of dock terminals provided on the abutting surface. The electrical connector structure includes a main body including a cavity and a plurality of through holes in communication with the cavity; a plurality of flexible terminals accommodated in the cavity, each of the flexible terminals having a contact portion, and each of the contact portions passing through and exposed at each of the through holes; and a waterproof ring including a ring body provided on the main body and surrounding an outer periphery of the plurality of through holes, having a flared ring piece extending from an interior side to an exterior side. When each of the contact portions is abutted against each of the dock terminals, the abutting surface presses against the flared ring piece such that the flared ring piece is deformed in an everted manner and is molded to fit the abutting surface.

In one embodiment of the present invention, the present invention provides a waterproof ring used for contacting an abutting surface. The waterproof ring includes a ring body including a flared ring piece extending from an interior side to an exterior side, wherein the abutting surface presses against the flared ring piece such that the flared ring piece is deformed in an everted manner and is molded to fit the abutting surface.

On the basis of the above, the ring body includes a flared ring piece extending from an interior side to an exterior side, the abutting surface presses against the flared ring piece when each of the contact portions is abuttingly connected to the dock terminals, such that the shape of the flared ring piece becomes deformed towards an exterior direction (in an everted manner) due to the downward pressure received and better molded to fit the abutting surface, thus avoiding the main body and the flexible terminals at the interior from being attached with moisture and dirt, and further enhancing waterproof and dustproof effects.

On the basis of the above, the flared ring piece extends and is formed from an interior side of the ring body towards an upward direction and the exterior side, and the width of the ring body is greater than a slope length of the flared ring piece, both of which allow the center of gravity of the flared ring piece to be closer to the ring body during the deformation and eversion of the flared ring piece, thus preventing the ring body from dislocating from a ring groove and reinforcing the structural stability of the electrical connector structure.

DETAILED DESCRIPTION OF THE EMBODIMENTS

Details and technical contents of the present invention are given with the accompanying drawings below. It should be noted that the accompanying drawings are for illustration purposes and are not to be construed as limitations to the present invention.

Referring to FIG. 1 to FIG. 6, the present invention provides an electrical connector structure and a waterproof ring thereof. The electrical connector structure 10 primarily includes a main body 1, a plurality of flexible terminals 3 and a waterproof ring 4.

As shown in FIG. 1 to FIG. 6, the main body 1 includes a cavity 11 and a plurality of through holes 12 in communication with the cavity 11. The main body 1 is provided with a ring groove 13 along an outer periphery of the plurality of through holes 12.

Details are described below. The main body 1 includes a housing 14 and a mobile cover 15. The housing 14 includes an upper plate 141 and a lower plate 142. The cavity 11 is formed between the upper plate 141 and the lower plate 142. The upper plate 141 is provided with an opening 143. The ring groove 13 is provided and formed from the upper plate 141. The mobile cover 15 is placed in the cavity 11 and has a protrusion block 151 embedded in and protruding from the opening 143. The plurality of through holes 12 are provided and formed on the protrusion block 151. The main body 1 further includes a circuit board 16, which is, for example but not limited to, placed in the cavity 11 or connected to the lower plate 142.

As shown in FIG. 1 to FIG. 6, the plurality of flexible terminals 3 are accommodated in the cavity 11 and are arranged between the lower plate 142 and the mobile cover 15. Each of the flexible terminals 3 has a contact portion 31, each of the contact portions 31 passes through and is exposed at each of the through holes 12, and one end of each of the flexible terminals 3 away from the contact portion 31 is electrically connected to the circuit board 16.

Further description is given below. In this embodiment, each of the flexible terminals 3 has a wave-shaped bent section 32 and an inverted U-shaped section 33 extending from the end of the wave-shaped bent section 32. Each of the wave-shaped bent section 32 is arranged between the lower plate 142 and the mobile cover 15, each of the inverted U-shaped section 33 passes through and is exposed at the opening 143, and each of the contact portions 31 is formed at the end of each of the inverted U-shaped section 33. The shape of each of the flexible terminals 3 may be adjusted as desired according to actual conditions, and is not limited to that shown in the diagram.

As shown in FIG. 1 to FIG. 6, the waterproof ring 4 includes a ring body 41 placed on the main body 1 and surrounding an outer periphery of the plurality of through holes 12. The ring body 41 is embedded in the ring groove 13, and comprises a flared ring piece 42 extending from an interior side to an exterior side; that is, the flared ring piece 42 extends and is formed from an inner side 411 of the ring body 41 towards an upward direction and an outer side. The width "a" of the ring body 41 is greater than a slope length "b" of the flared ring piece 42.

Figure 1:
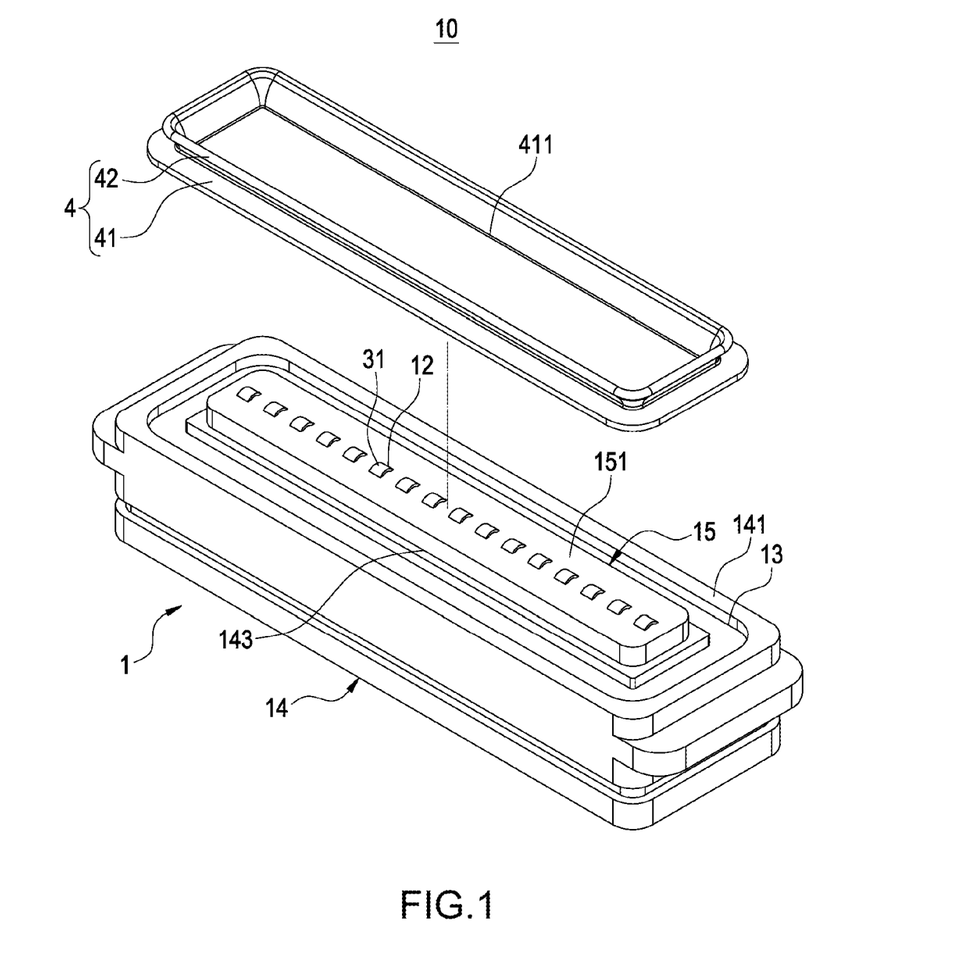
FIG. 1 is an exploded perspective diagram of an electrical connector structure of the present invention.
Figure 2:
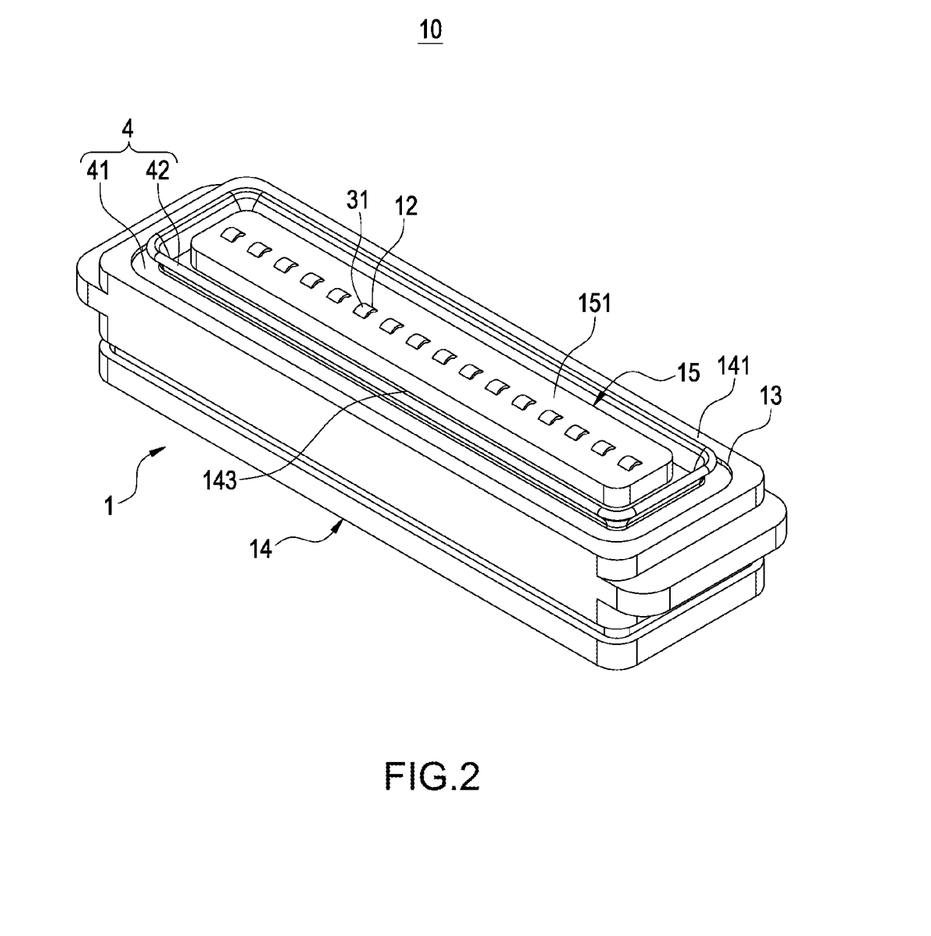
FIG. 2 is a perspective assembly diagram of an electrical connector structure of the present invention.
Figure 3:
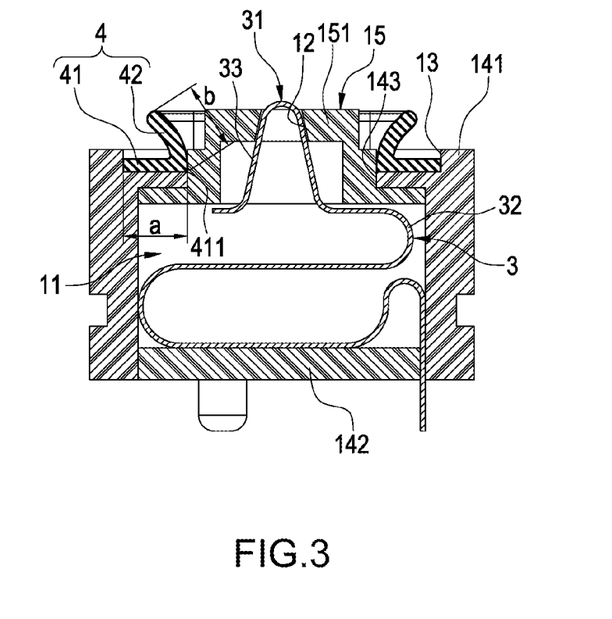
FIG. 3 is a section schematic diagram of an electrical connector structure of the present invention.
Figure 4:
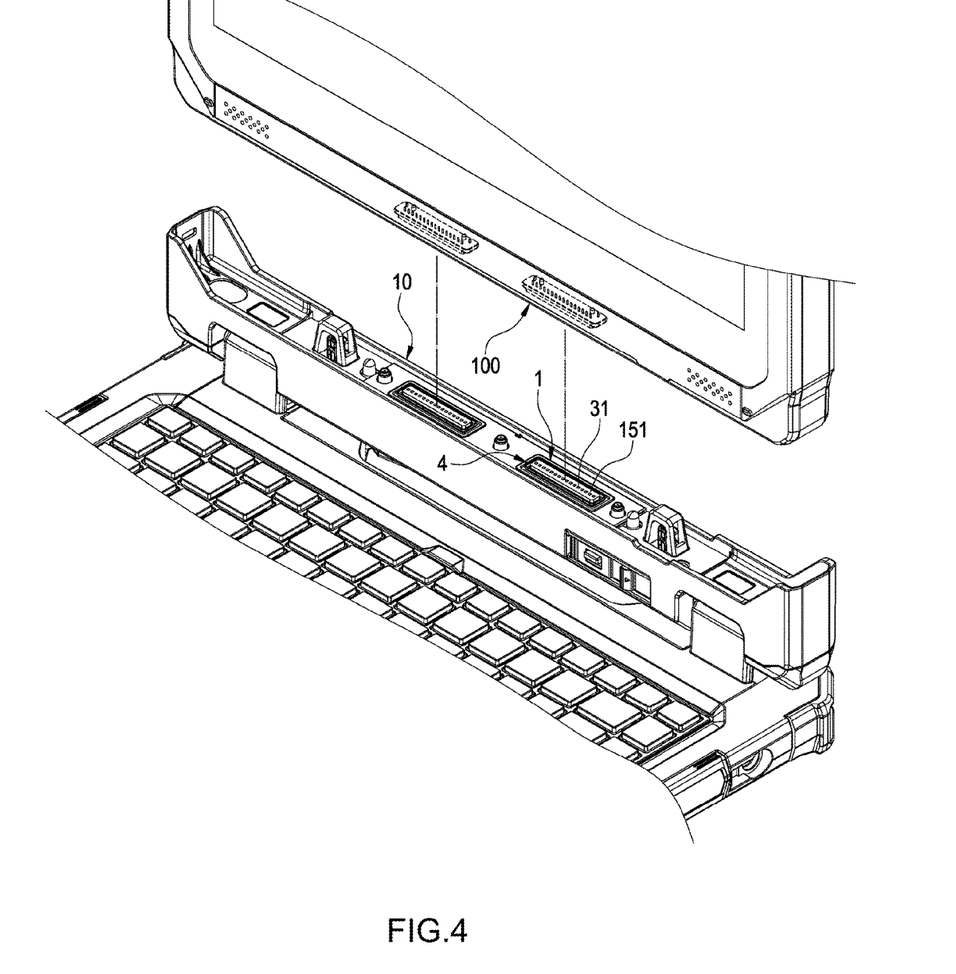
FIG. 4 is a schematic diagram of a first state of use of an electrical connector structure of the present invention.
Figure 5:
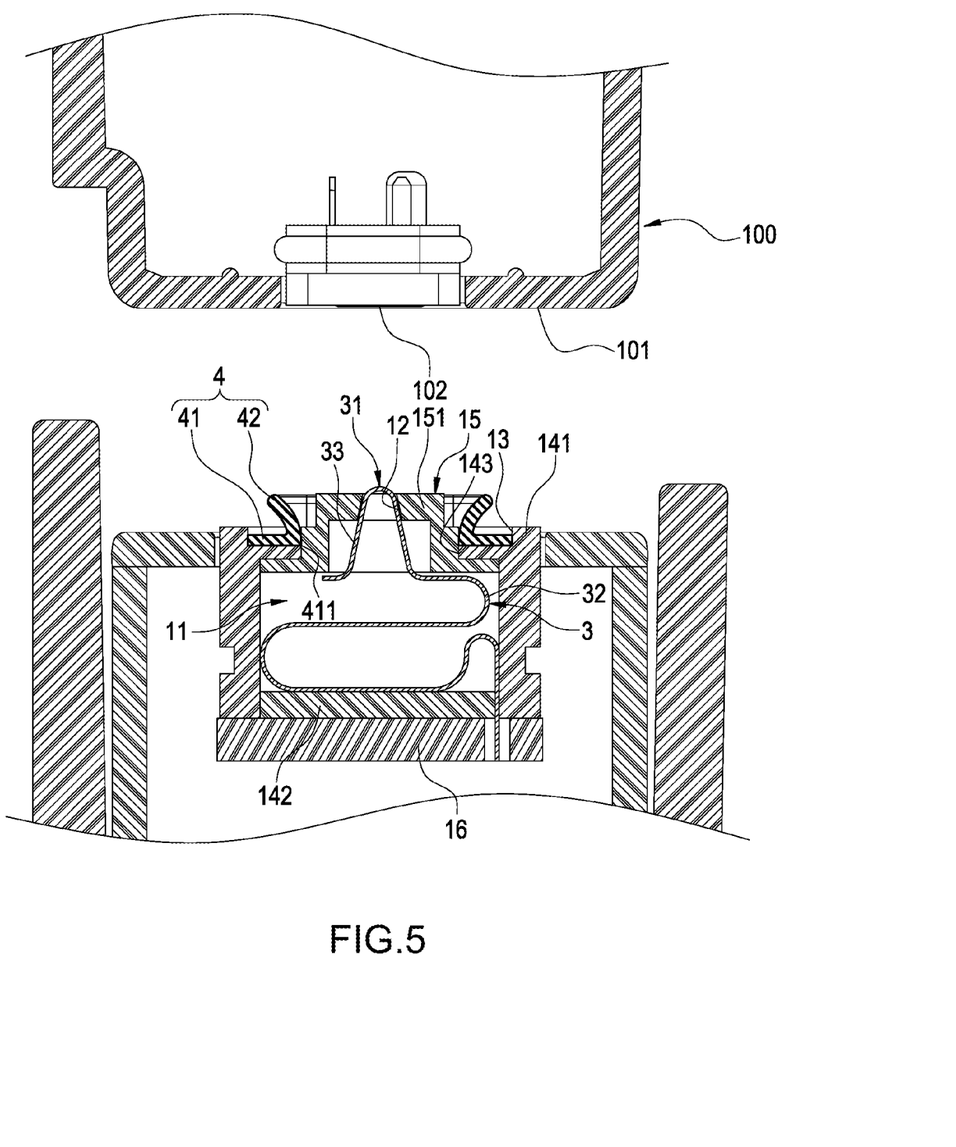
FIG. 5 is a schematic diagram of a second state of use an electrical connector structure of the present invention.
Figure 6:
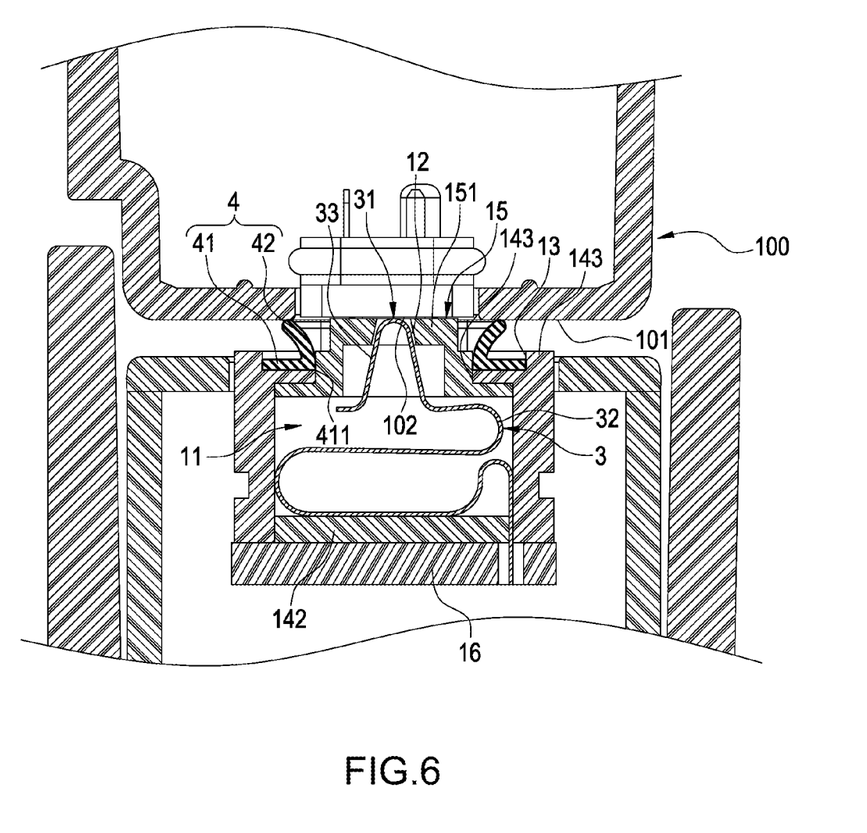
FIG. 6 is a schematic diagram of a third state of use of an electrical connector structure of the present invention.

As shown in FIG. 4 to FIG. 6, for example, the electrical connector structure of the present invention 10 is in a dock type, and may be installed on a connector port of an external keyboard. Furthermore, the electrical connector structure 10 may be used to electrically connect to a dock connector 100 of a tablet computer, and an actual implementation pattern of the electrical connector structure 10 may be adjusted as desired according to actual conditions and is not limited to the example shown.

Further detailed description is given below. The dock connector 100 includes an abutting surface 101 and a plurality of dock terminals 102 provided on the abutting surface 101. When each of the contact portions 31 is abuttingly connected to each of the dock terminals 102, the abutting surface 101 presses against the flared ring piece 42, such that the flared ring piece 42 becomes deformed in an everted manner and molded to fit the abutting surface 101. Consequently, a seal at an interface between the flared ring piece 42 and the abutting surface 101 is created.

Referring to FIG. 5 and FIG. 6 showing states of use of the electrical connector structure 10 and the waterproof ring 4 of the present invention, by using the ring body 41 having the flared ring piece 42 extending from an interior side to an exterior side, when each of the contact portions 31 is abuttingly connected to each of the dock terminals 102, the abutting surface 101 presses against the flared ring piece 42, and the shape of the flared ring piece 42 becomes deformed towards an exterior direction (in an everted manner) due to a downward pressure received and better molded to fit the abutting surface 101. Thus, the main body 1 and the flexible terminals 3 at the interior are avoided from being attached with moisture and dirt, further enhancing waterproof and dustproof effects.

Furthermore, the flared ring piece 42 extends and is formed from the inner side 411 of the ring body 41 towards an upward direction and an outer side, and the width "a" of the ring body 41 is greater than the slope length "b" of the flared ring piece 42, both of which allow the center of gravity of the flared ring piece 42 to be closer to the ring body 41 during the eversion and deformation of the flared ring piece 42, thus preventing the ring body 41 from dislocating from the ring groove 13 and reinforcing the structural stability of the electrical connector structure 10.

Figure 7:
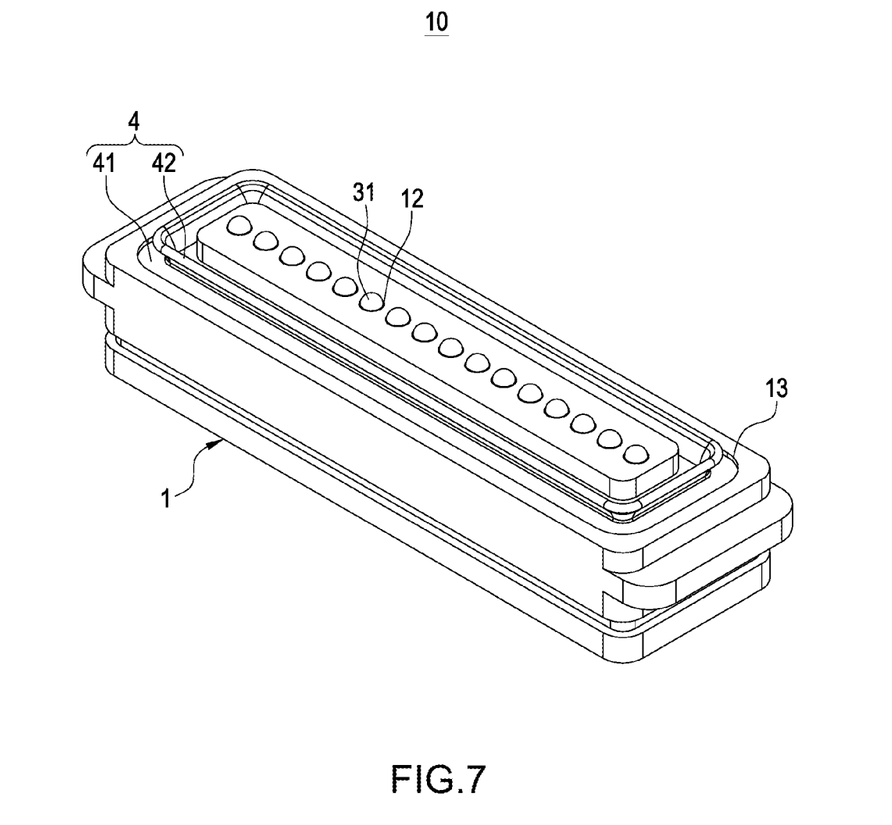
FIG. 7 is a perspective assembly diagram of an electrical connector structure according to another embodiment of the present invention.

FIG. 7 shows the electrical connector structure 10 according to another embodiment of the present invention. Referring to FIG. 7, the embodiment in FIG. 7 is substantially identical to the embodiments shown in FIG. 1 to FIG. 6, and differs from the embodiments shown in FIG. 1 to FIG. 6 by the type of the electrical connector structure 10. The electrical connector structure 10 in FIG. 1 to FIG. 6 is a dock type, whereas the embodiment shown in FIG. 7 is a pogo pin type. However, the type of the electrical connector structure 10 of the present invention is not limited to the two examples above.

In conclusion, the electrical connector structure and the waterproof ring thereof of the present invention neither are disclosed in similar products and nor have been publicly used, and are industrially applicable, novel and involve an inventive step, which meet the requirements of a patent application. Therefore, a patent application is filed accordingly, and granting the application with patent rights is respectfully requested to ensure rights of the Inventor.

What is claimed is:

1. An electrical connector structure, used for a dock connector, the dock connector comprising an abutting surface and a plurality of dock terminals provided on the abutting surface, the electrical connector structure comprising:

a main body, comprising a cavity and a plurality of through holes in communication with the cavity;

a plurality of flexible terminals, accommodated in the cavity, each of the flexible terminals having a contact portion, each of the contact portions passing through and exposed at each of the through holes; and a waterproof ring, comprising a ring body provided on the main body and surrounding an outer periphery of the plurality of through holes, the ring body comprising a flared ring piece extending from an interior side to an exterior side;

wherein, when each of the contact portions is abuttingly connected to each of the dock terminals, the abutting surface presses against the flared ring piece such that the flared ring piece is deformed in an everted manner and molded to fit the abutting surface.

2. The electrical connector structure according to claim 1, wherein a width of the ring body is greater than a slope length of the flared ring piece.

3. The electrical connector structure according to claim 2, wherein the flared ring piece extends and is formed from an inner side of the ring body towards an upward direction and an outer side of the ring body.

4. The electrical connector structure according to claim 3, wherein the main body is provided with a ring groove along the outer periphery of the plurality of through holes, and the ring body is embedded in the ring groove.

5. The electrical connector structure according to claim 4, wherein the main body comprises a housing and a mobile cover, the housing comprises an upper plate and a lower plate, the cavity is formed between the upper plate and the lower plate, the upper plate is provided with an opening, the ring groove is provided and formed from the upper plate, the mobile cover is placed in the cavity and comprises a protrusion block embedded in and protruding from the opening, the plurality of through holes are provided and formed from the protrusion block, and the plurality of flexible terminals are arranged between the lower plate and the mobile cover.

6. The electrical connector structure according to claim 5, wherein the main body further comprises a circuit board, the circuit board is accommodated in the cavity or connected to the lower plate, and one end of each of the flexible terminals away from the contact portion is electrically connected to the circuit board.

7. The electrical connector structure according to claim 6, wherein each of the flexible terminals has a wave-shaped bent section and an inverted U-shaped section extending from an end of the wave-shaped bent section, each of the wave-shaped bent section is arranged between the lower plate and the mobile cover, each of the inverted U-shaped section passes through and is exposed at the opening, and each of the contact portions is formed at an end of each of the inverted U-shaped section.

* * * * *